United States Patent [19]

Tsergas

[11] 4,104,552
[45] Aug. 1, 1978

[54] SYNCHRONOUS MOTOR STRUCTURE
[75] Inventor: Athanase N. Tsergas, Medinah, Ill.
[73] Assignee: Merkle-Korff Gear Co., Des Plaines, Ill.
[21] Appl. No.: 664,034
[22] Filed: Mar. 4, 1976
[51] Int. Cl.² ............................................. H02K 21/14
[52] U.S. Cl. .................................. 310/156; 310/163; 310/164; 310/41
[58] Field of Search ........................ 310/156, 162–165, 310/41, 60, 62, 63, 190–193

[56] References Cited

U.S. PATENT DOCUMENTS

| 2,019,683 | 11/1935 | Kohlhagen | 310/163 |
|---|---|---|---|
| 3,092,743 | 6/1963 | Van Ott et al. | 310/164 X |
| 3,205,383 | 9/1965 | Hurst | 310/162 |
| 3,416,017 | 12/1968 | Krug | 310/41 X |
| 3,502,921 | 3/1970 | Sazuki et al. | 310/190 X |
| 3,881,243 | 5/1975 | Bannon | 310/156 X |
| 3,898,488 | 8/1975 | Erwin et al. | 310/156 X |
| 3,978,354 | 8/1976 | Lee et al. | 310/63 X |

Primary Examiner—Donovan F. Duggan
Attorney, Agent, or Firm—Gary, Juettner & Pyle

[57] ABSTRACT

A synchronous motor of improved construction characterized by a large diameter rotor mounted in axially juxtaposed parallel relation to the stator coil or coils, rather than within the interior of the stator coil or coils; the stator coil or coils being of substantially the same diameter as the rotor and having stator pole pieces circumscribing the rotor at the outer periphery of the coil or coils, rather than the inner periphery of the coils.

In the preferred construction, first and second annular electrical coils of given outer diameter are positioned on opposite sides of a coaxially mounted wheel-like rotor of substantially equal outer diameter. A pair of circular plates of magnetically permeable material are positioned adjacent opposite sides of each coil perpendicular to the axis thereof, and have tooth-like flanges extending axially from their outer edges adjacent the outer periphery of the rotor, whereat the ends of the flanges of each pair of plates define a plurality of interleaved poles. The periphery of the rotor is of permanent magnet material having alternating north and south poles formed circumferentially therearound. Upon the application of an a.c. voltage across the coils, adjacent poles formed by the flanges of each pair of plates become of opposite magnetic polarity, and alternate polarity with each half cycle of the a.c. voltage, to turn the rotor.

Maximum torque may thus be produced within given dimensional tolerances due to maximization of the effective moment arm of the rotor and maximization of the number of windings accommodated by the coils.

9 Claims, 4 Drawing Figures

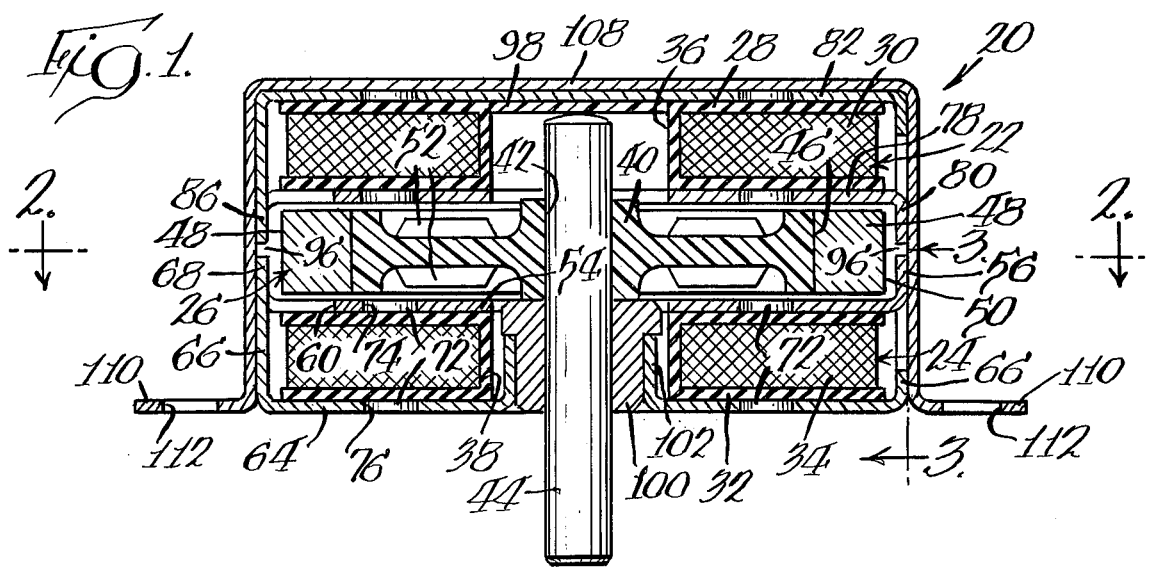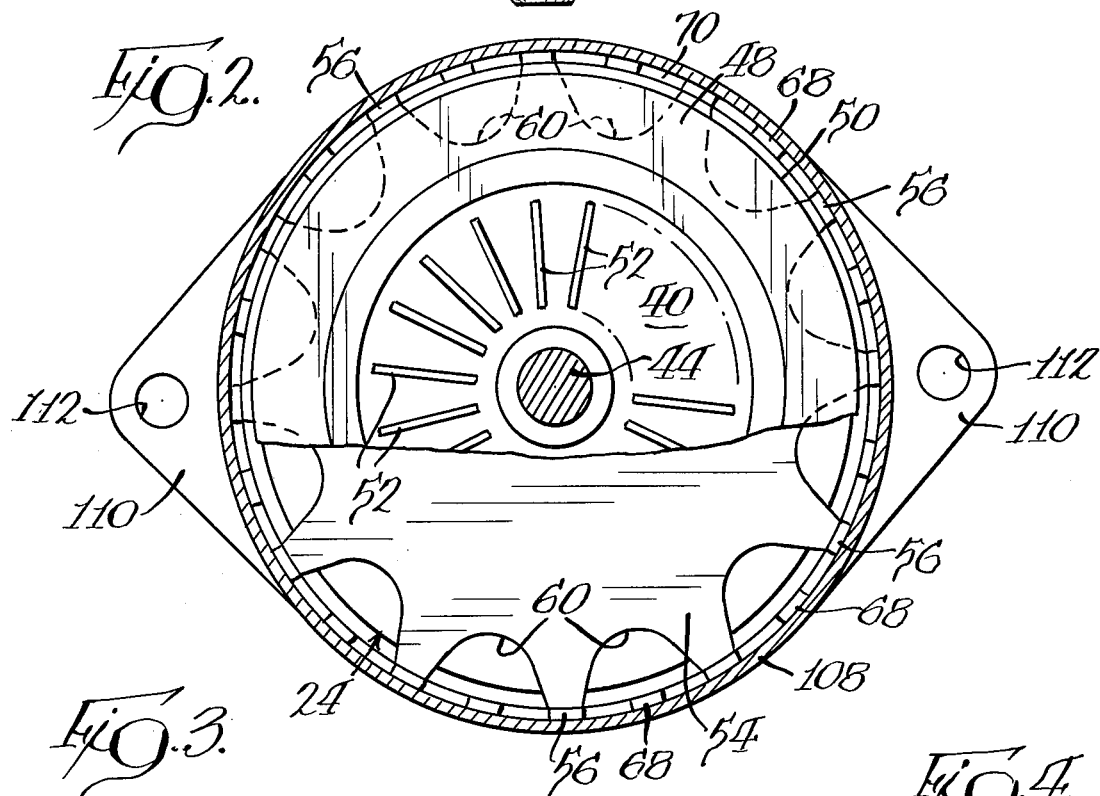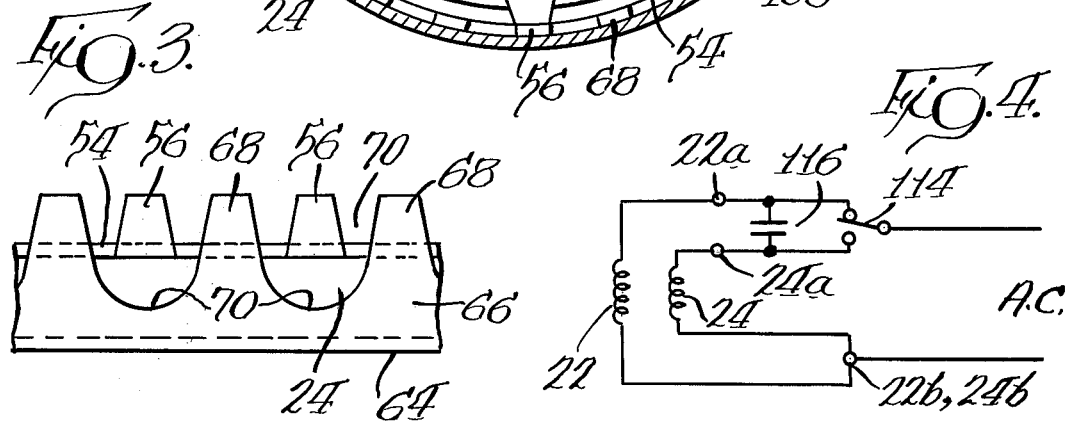

SYNCHRONOUS MOTOR STRUCTURE

BACKGROUND OF THE INVENTION

The present invention relates to synchronous motors, and in particular to an improved structure for a synchronous motor which maximizes the available output torque for a motor of given physical size.

Conventionally, fractional horsepower synchronous motors are formed of a pair of tubular or annular electrical coils coaxial with each other, and a cylindrical rotor extended through the center holes of the coils and having an outer peripheral surface of magnetic material defining alternating north and south poles therearound. A pair of plates of magnetically permeable material are positioned adjacent opposite sides of each coil, and have integral flanges formed around the center holes thereof. The flanges of each pair extend toward each other between the inner periphery of the coils and the outer periphery of the rotor, and each pair of flanges defines circumferentially around the rotor a plurality of poles. Upon the application of an a.c. voltage across the coils, adjacent poles formed by the flanges of each pair become of opposite magnetic polarity, and alternate polarity with each half cycle of the a.c. voltage to turn the rotor.

For a fixed operating voltage, the torque which the rotor develops for a given wire size is generally controlled by (a) the number of windings in the coils, which determines the strength of the magnetic field generated at the poles of the flanges associated therewith, and therefore the force exerted by the field on the magnetic material of the rotor, and (b) the diameter of the rotor, which determines the distance from the shaft about which the force acts. In other words, the moment of force about the shaft of the rotor is generally determined by the number of windings of the coils and by the diameter of the rotor.

To increase the torque or moment of force of the rotor, the number of coil windings may be increased, or the diameter of the rotor may be increased, or both. In either event, the net result with a conventionally designed synchronous motor is an increase in the physical size of the motor, either as a result of an increase in the size of the coils as the number of windings is increased, or as a result of an increase in the size of both the rotor and the coils as the diameter of the rotor is increased. In certain uses of synchronous motors, where the physical size of the motor is not critical, an increase in size to achieve greater output torque may be acceptable. In other cases, however, where the area which may be occupied by the motor is limited, an increase in size of the motor may be intolerable.

If, without increasing the physical size of the motor, the diameter of the rotor is increased to increase the distance from the shaft about which the magnetic force acts, then the size of the coils must be reduced to accommodate the larger rotor. Reducing the size of the coils requires decreasing the number of coil windings, which in turn decreases the strength of the magnetic field at their associated poles, and therefore the force that acts on the rotor. Accordingly, although the distance through which the force acts is increased, the force is decreased and thus there is little if any change in torque output.

In the alternative, within given physical dimensions, if the size of the coils is increased by increasing the number of coil windings to generate a magnetic force of greater strength to act on the rotor, the diameter of the rotor must be decreased to accommodate the larger coils. Then, although the magnetic force exerted on the rotor is increased, the distance from the shaft about which the force acts is decreased and again there is little if any change in torque output.

OBJECTS OF THE INVENTION

It is an object of the present invention to provide an improved construction for synchronous motors which maximizes the output torque from the motor for a given physical size of motor.

It is another object of the invention to provide a synchronous motor structure wherein the magnetic force acting on the rotor is maximized without decreasing the distance from the rotor shaft about which the force acts.

It is a further object of the invention to provide a synchronous motor structure wherein the distance from the rotor shaft about which the magnetic force acts is maximized without decreasing the magnitude of the force.

SUMMARY OF THE INVENTION

In accordance with the present invention, a synchronous motor is characterized by at least one washer-shaped annular electrical coil, and a wheel-like circular rotor rotatably mounted in spaced parallel, coaxial relationship with the coil proximate thereto. First and second plates of magnetically permeable material are mounted adjacent to and on opposite sides of the coil essentially perpendicular to the axis thereof, and have first and second outer peripheral portions, respectively, of magnetic material. The peripheral portions of the plates include a plurality of magnetic poles which extend axially and non-contactingly toward, in proximity with, and circumferentially around the outer periphery of the rotor, with the poles of one of the peripheral portions interleaved between the poles of the other peripheral portion.

As a consequence, the rotor does not extend axially through the coil and therefore the outer diameter of the rotor is not reliant on the inner diameter of the coil, or vice versa. Consequently, both the diameter of the rotor and the number of windings in the coil can be maximized within any given dimensional tolerances to increase both the moment arm and the force applied thereby to provide maximum torque for the given size, or stated conversely, to provide a given torque within far smaller dimensional limitations.

In the preferred embodiment, first and second annular electrical coils, having approximately the same diameter as the rotor, are positioned on opposite sides of the rotor coaxial therewith. Each coil is connected to an a.c. source for generating a field of magnetic flux which alternately changes direction with the alternating polarity of the voltage. A first plurality of poles of magnetic material extends in proximity with and circumferentially around the outer periphery of the rotor, with alternate ones of the poles coupled with a field of magnetic flux generated by the first coil on the side thereof toward the rotor, and with the remaining poles coupled with a field of magnetic flux generated by the coil on the opposite side thereof. A second plurality of poles of a magnetic material is positioned in proximity with and circumferentially around the outer periphery of the rotor, spaced from and aligned with the poles of the first plurality, with alternate one of the poles of the second plurality coupled with a field of magnetic flux generated by the second coil on the side thereof toward the rotor, and with the remaining poles coupled with a field of magnetic flux generated by the second coil on the opposite side thereof.

The above stated objects of the invention are thus attained with particular facility and economy. Other objects and advantages of the invention will become apparent from the following detailed description when taken in conjunction with the accompanying drawings.

BRIEF DESCRIPTION OF THE DRAWING

FIG. 1 is a vertical or axial section of a synchronous motor constructed in accordance with the teachings of the invention;

FIG. 2 is a cross-sectional view taken substantially along line 2—2 of FIG. 1, with the rotor partially broken away to illustrate its relationship to the magnetic poles of one of the stator coil structures;

FIG. 3 is a fragmentary elevational view of the periphery of one stator coil assembly, the view being taken substantially along line 3—3 of FIG. 1 and illustrating the confriguration of the interleaved magnetic poles; and FIG. 4 illustrates a typical circuit for the synchronous motor.

DETAILED DESCRIPTION OF THE PREFERRED EMBODIMENT

Referring to FIG. 1 of the drawings, a synchronous motor 20 constructed in accordance with the teachings of the invention preferably includes first and second generally washer-shaped, annular, cylindrical or circular electrical coil assemblies 22 and 24 positioned on opposite sides of, parallel to and coaxial with, a cylindrical or circular, generally wheel-shaped rotor assembly 26 of essentially the same outer diameter as the coil assemblies. The coil assembly 22 is formed of a spool 28 of an insulating material with a plurality of conductor windings 30 therearound. Similarly, the coil assembly 24 is formed of a spool 32 of insulating material with a plurality of conductor windings 34 therearound.

Each of the coils 22 and 24 has a pair of input terminals 22a and 22b, and 24a and 24b, respectively, illustrated schematically in FIG. 4, adapted to receive an a.c. voltage thereacross. With the coil windings 30 and 34 extending into and out of the page in FIG. 1, an a.c. voltage applied across each coil generates a field of magnetic flux extending around the outer peripheries of the coils and through centers 36 and 38 of the spools 28 and 32, respectively, having a magnitude and a direction in accordance with the magnitude and polarity of the a.c. voltage. As a result, the direction of the generated fields of flux changes with each half-cycle of the a.c. voltage.

The rotor assembly 26 preferably has an inner annular portion 40 of lightweight, nonferromagnetic or nonmagnetic material, such as plastic, having a center passageway 42 within which a rotor shaft 44 is secured. The annular portion 40 carries on the outer peripheral surface 46 thereof an annular ring of permanent magnet material 48, (ie, alnico, ceramic or rubber). A plurality of alternate north and south magnetic poles are permanently magnetized into the magnetic material 48 circumferentially around the outer peripheral surface 50 thereof, which is also the outer peripheral surface of the rotor assembly 26. In the alternative, the ring 48 could be of plastic and integral with the center lightweight portion 40 of the rotor 26, with the magnetic poles formed circumferentially around the peripheral surface 50 by securing discrete permanent magnets thereto. A plurality of vanes 52 formed integrally with and on opposite sides of the portion 40 of the rotor 26 comprise a fan for circulating air within the motor to dissipate heat.

To rotate the rotor 26, the magnetic flux generated by the coils 22 and 24 is selectively coupled with the magnetic poles formed around the outer periphery of the rotor 26 in a manner to provide a plurality of magnetic poles circumferentially around the rotor, of successively alternating north and south polarity, and having a polarity at any particular time in accordance with the direction of the flux generated by the coils. The coupling is accomplished with plates of a ferromagnetic material, such as steel, operatively associated with the magnetic flux generated on opposite sides of each coil to carry, or to couple, the flux to a plurality of predetermined points around and in proximity with the periphery of the rotor.

More particularly, to couple the flux generated by the electrical coil 24 with the magnetic north and south poles around the periphery of the rotor 26, a generally circular or annular plate 54 of a magnetically permeable material, such as steel, is extended across and adjacent to a surface of the coil 24, essentially perpendicular to the center axis thereof, between the coil and the rotor 26 to receive the flux generated at that surface of the coil. With reference to all of FIGS. 1-3, a plurality of magnetic poles 56, in the form of circumferentially spaced teeth, are formed integrally with the periphery of the plate 54 and extend essentially parallel to the axis of the coil 24 toward and partially over the outer peripheral surface 50 of the rotor 26. Intermediate each of the poles 56, the plate 54 is slotted accurately inward, as indicated at 60, to define paths to the poles 56 which concentrate at the poles the magnetic flux received by the plate 54 when the coil 24 is energized. Also, the slots 60 form a plurality of passages through which air may be moved by the vanes 52 of the rotor 26 to cool the coil 24.

The plate 54 thus couples the magnetic flux generated by the coil 24 on the side thereof adjacent the rotor 26 to the plurality of poles 56 around the rotor. To couple the flux generated by the coil 24 on the opposite side thereof to points circumferentially around the rotor, a generally circular plate 64, also of a magnetically permeable material, extends across and adjacent to that surface of the coil 24, essentially perpendicular to the axis thereof. An annular flange 66, integral with the plate 64, extends from the periphery thereof, around the outer periphery of the coil 24, and toward the rotor 26 in a direction essentially parallel to the axis of the coil 24. A plurality of magnetic poles 68, in the form of circumferentially spaced teeth, are formed integrally with the flange 66 and extend toward and partially over the periphery of the rotor 26 in the spaces between the poles 56. Intermediate each of the poles 68, the flange 66 is slotted accurately toward the plate 64, as indicated at 70, to define paths to the poles 68 which concentrate at the poles the magnetic flux received by the plate 64 when the coil 24 is energized.

As described, the poles 56 of the plate 54 and the poles 68 of the plate 64 define an alternating circumferential array of interleaved magnetic poles around, partially over, and in proximity with the outer peripheral surface of the rotor 26, with the poles 68 received medially within the spaces between the poles 56, and with the poles 56 similarly received medially within the spaces between the poles 68. To insure uniform circumferential spacing and noncontacting assembly of the poles 56 and 68, the plates 54 and 64 are oriented with the coil 24 by axially extending bosses 72 formed integral with the spool 32 and received within openings 74 in the plate 54 and openings 76 in the plate 64.

When an a.c. voltage is applied across the coil 24, the alternating field of flux of the coil enters and is received by the plates 54 and 64 in opposite directions, and the poles 56 and 68 associated therewith therefore become of opposite magnetic polarity. Also, the poles alternate in polarity with the applied voltage of the a.c. source and the consequent changes in the direction of the flux field generated by the coil. In other words, adjacent poles of the array poles 56 and 68 become of opposite magnetic polarity, and alternate in polarity with each half-cycle of the a.c. voltage, to exert magnetic forces on the magnetized periphery of the rotor 26 which tend to rotate the rotor.

To couple the flux generated by the coil 22 with the magnetic north and south poles around the periphery of the rotor 26, the coil 22 is provided with magnetically permeable plates 78 and 82 comparable to or the same as the plates 54 and 64, respectively, defining poles 80 and 86 comparable to or the same as poles 56 and 68, respectively. Preferably, the coil assemblies are identical so that the same may be mass produced at greatest economy. Since the assemblies are identical, no further description of the assembly of coil 22 or the mode of operation thereof is necessary.

As shown, the poles 56 and 68 associated with the coil 24, and the poles 80 and 86 associated with the coil 22, are aligned with each other, respectively, and extend toward each other across the outer peripheral surface 50 of the rotor 26. The ends of the respective poles are juxtaposed to one another and define a space 96 therebetween at approximately the midpoint of the peripheral surface 50 of the rotor 26. The space 96 is, of course, necessary to prevent direct coupling between the fluxes generated by the coils 22 and 24.

The coil 22 with its associated pole plates 78 and 82 are press-fitted or otherwise suitably secured coaxially within a cylindrical, cup-shaped motor housing 108 in abutting engagement with the closed end wall thereof. A thrust bearing or plate 98 is mounted within the central opening in the coil assembly 22, or at least the plate 82 thereof. The rotor 26 and the shaft 44 are then inserted in the housing, with the rotor so mounted on the shaft as to space the rotor slightly from the pole plate 78 when the inner end of the shaft abuts against or otherwise cooperatively engages with the thrust bearing 98.

The pole plate 64 of the coil assembly 24 includes an inner annulur flange 102 coaxial with and extending into the interior of the assembly for reception of a shaft mounting bearing 100. The bearing includes a flanged head abutted against the inner end surface of the pole plate flange 102, and so dimensioned that when the inner surface thereof abuts lightly against the hub of the rotor 26, the rotor is spaced a slight distance from the inner pole plate 54 of the coil assembly 24. Consequently, the coil assembly 24 with its associated poles plates 54 and 64 and bearing 100 may be press-fitted or otherwise inserted into and secured within the housing 108 to abut the bearing 100 against the hub of the rotor and cause the inner end of the rotor shaft to be abutted against the bearing 98, and to journal the shaft in the bearing 100 coaxially in the housing. The single expedient of inserting the coil assembly 24 in the housing thus mounts the rotor for rotation in the housing in proper, aligned relationship to the two coils and the pole pieces thereof, confines the rotor against axial play between the bearing 98 and the inner radial face of the bearing 100, and traps the bearing 100 in the flange 102, whereby the assembly of the motor is effected very efficiently and economically. Also, the plate 64 and bearing 100 effectively seal the outer face of the motor assembly without necessity for a separate cover plate.

The housing 108 is formed of non-magnetic material, or is otherwise magnetically isolated from the pole pieces 56, 68, 80 and 86 so as not to impede or short circuit the magnetic flux paths previously described. Preferably, the housing includes a pair of diametrically opposed radially outwardly extending flanges 110 having openings 112 therein through which fasteners may be extended for mounting the motor assembly.

Referring now to FIG. 4, the electrical circuitry of the motor preferably comprises a capacitor start circuit for applying an a.c. voltage to the motor assembly to selectively control the direction of rotation of the rotor 26 thereof. With the poles 56 aligned with the poles 80, and with the poles 68 aligned with the poles 86, a two-position switch 114 applies, in the state thereof shown, an a.c. voltage directly across the coil 22, and through a capacitor 116 across the coil 24, to rotate the rotor 26 in a first direction of rotation. With the switch 114 positioned in its other state, a.c. voltage is applied directly across the coil 24, and through the capacitor 116 across the coil 22, to cause the rotor 26 to rotate in the opposite direction of rotation. It is to be understood that the connections of the coils 22 and 24 to the a.c. voltage are such that at any given time the polarity of the aligned pairs of electromagnetic poles 56 and 80, and 68 and 86, will be the same so as to miminize efficiency losses, and that for a given number of rotor magnetic poles the synchronous speed of the motor is determined by the well known formula $$f = (Pp \times \text{RPM})/60$$

where:
 $f$ = frequency of the a.c. voltage
 $Pp$ = rotor pole pairs
 RPM = revolutions per minute.

The synchronous motor 20, as described in its preferred two coil, reversible embodiment, utilizes for its operation a circuit of the type shown in FIG. 4 for applying an a.c. voltage to both the coils 22 and 24. In a less preferred but nevertheless useful embodiment, only a single coil is employed, preferably the coil 24 and its associated components, and a.c. voltage is applied directly to the coil without need for a circuit such as shown in FIG. 4. In the latter case, where only the coil 24 is to be energized, the direction of rotation of the rotor 26 may be controlled by magnetically linking (as with a strap of magnetically permeable material, not shown) an adjacent pair of the poles 56 and the pole 68 therebetween to cause the rotor 26 to turn in a first direction of rotation, or by magnetically linking an adjacent pair of the poles 68 and the pole 56 therebetween to cause the rotor to turn in the second or opposite direction of rotation. By utilizing a selectively movable link, a reversible motor could be provided.

In view of the foregoing description, it may now be appreciated how the synchronous motor structure of the invention provides at the output shaft thereof a significantly greater torque than could be provided by a conventional motor of like physical size. In the synchronous motor of the invention, as compared with conventional motors, the diameter of the rotor has been maximized since it is mounted parallel to or between, and not within the interior of, the coils. Consequently, with the pole pieces of the coils located outwardly of the outer periphery of the rotor, the distance from the rotor shaft about which the magnetic force acts, and thus the moment arm of the applied force, has been maximized. Secondly, the increase in the rotor diameter has not been attained by sacrificing the size of the coils. To the contrary, the size of the electrical coils has been maximized since the inner diameter thereof is no longer limited by the outer diameter of the rotor. Consequently, the number of windings in each coil and the magnetic flux generated thereby has been maximized, whereby the strength of the magnetic field at the associated poles which exerts the turning force on the periphery of the rotor has also been maximized. Thirdly, by maximizing the diameter of the rotor, for a given number of magnetic poles on the periphery of the rotor the distance between adjacent poles is maximized, resulting in a stronger magnetic flux at the poles to further increase the turning force exerted on the rotor. Thus, for a given physical size the synchronous motor of the invention develops a significantly greater moment of force about its shaft than does a conventional synchronous motor of like physical size.

While only the preferred embodiment of the invention has been described in detail, it is to be understood that various other embodiments and modifications thereof may be devised by one skilled in the art without departing from the spirit and the scope of the invention, as defined by the appended claims.

What is claimed is:

1. In a synchronous motor structure, a circular rotor having an outer peripheral surface of a magnetic material with permanent magnet north and south poles alternately formed therein circumferentially therearound; first and second annularly shaped electrical coils, having approximately the same diameter as said rotor, positioned on opposite sides of the rotor and coaxial therewith, each coil having a pair of inputs thereto for receiving an a.c. voltage for generating a field of magnetic flux; a first plurality of poles of a magnetic material in proximity with and extending circumferentially around the outer periphery of said rotor, with alternate ones of said poles magnetically coupled with a field of magnetic flux generated by said first coil on the side thereof toward said rotor, and with the remaining poles of said first plurality magnetically coupled with a field of magnetic flux generated by said coil on the opposite side thereof; and a second plurality of poles of a magnetic material in proximity with and extending circumferentially around the outer periphery of said rotor spaced from and aligned with said poles of said first polarity, with alternate ones of said poles of said second plurality magnetically coupled with a field of magnetic flux generated by said second coil on the side thereof toward said rotor, and with the remaining poles of said second plurality magnetically coupled with a field of magnetic flux generated by said coil on the opposite side thereof, said first and second plurality of poles extending across opposite peripheral halves of said rotor toward, but not across, the center of said periphery thereof.

2. In a synchronous motor structure, a rotatable shaft; a circularly shaped rotor mounted on said shaft, said rotor having an outer periphery of magnetic material with magnetic north and south poles permanently and alternatingly formed therein circumferentially therearound; first and second circularly shaped electrical coils on opposite sides of the rotor and coaxial therewith each having a pair of inputs thereto for receiving an a.c. voltage and for generating a field of magnetic flux; a first member of magnetically permeable material to be magnetically coupled with a field of flux of said first coil, extending across the surface of said first coil opposite from said rotor and around and past the outer periphery of said coil to a position adjacent and circumferentially around the periphery of said rotor whereat said member has a first plurality of spaced magnetic material poles; a second member of magnetically permeable material, to be magnetically coupled with the field of flux of said first coil, extending across the surface of said first coil between said coil and said rotor to a position adjacent and circumferentially around the periphery of said rotor whereat said second member has a second plurality of spaced magnetic material poles noncontactingly interleaved with said first plurality, said first and second pluralities of magnetic material poles extending across an associated half of the periphery of said rotor toward, but not across, the center of the periphery; a third member of magnetically permeable material to be magnetically coupled with the field of flux of said second coil, extending across the surface of said second coil between said coil and said rotor to a position adjacent and circumferentially around the periphery of said rotor whereat said third member has a third plurality of spaced magnetic material poles; and a fourth member of magnetically permeable material, to be magnetically coupled with a field of flux of said second coil, extending across the surface of said second coil opposite from said rotor and around and past the outer peripherly of said coil to a position adjacent and circumferentially around the periphery of said rotor whereat said fourth member has a fourth plurality of spaced magnetic material poles noncontactingly interleaved with said third plurality, said third and fourth pluralities of magnetic material poles extending across an associated opposite half of the periphery of said rotor toward, but not across, the center of the periphery, whereby said first and second interleaved plurality of poles, and said third and fourth interleaved plurality of poles, extend noncontactingly toward each other across opposite halves of the magnetic material outer periphery of the rotor to a point in proximity with but not across the center of the periphery of the rotor.

3. In a synchronous motor structure as set forth in claim 2, wherein successive poles of said first plurality extend into successive spaces between the poles of said second plurality, and vice versa, and wherein successive poles of said third plurality extend into successive spaces between the poles of said fourth plurality, and vice versa, said first and second pluralities of poles, and said third and fourth pluralities of poles, being in circular arrays around the periphery of said rotor.

4. In a synchronous motor structure as set forth in claim 3, wherein said first, second, third and fourth members are generally circular plates and extend across the surfaces of the coils essentially perpendicular to the axes thereof; wherein said first and fourth plates each have an integral flange around the outer periphery thereof extending essentially parallel to the axes of the coils toward the rotor, said first and fourth pluralities of poles extending from the ends of said flanges of said first and fourth plates, respectively; and wherein said first and fourth pluralities of poles are first and fourth pluralities, respectively, of teeth of magnetic material extending from the ends of said flanges, and said second and third pluralities of poles are second and third pluralities, respectively, of teeth of magnetic material extending from the peripheries of said second and third plates.

5. In a synchronous motor structure as set forth in claim 4, wherein said teeth of said first and fourth plates are joined by arcuate flange portions.

6. In a synchronous motor structure as set forth in claim 4, wherein said coils have an annular configuration, and wherein said rotor is generally cylindrical in configuration and has a plastic circular center portion for supporting said periphery of magnetic material.

7. In a synchronous motor structure as set forth in claim 6, wherein said coils and rotor are approximately of equal diameter.

8. In a synchronous motor structure as set forth in claim 7, further including a housing extending around and enclosing, with said fourth plate, said coils, rotor and first, second and third plates, wherein said second, third and fourth plates have open central areas for receiving therethrough the rotor shaft with the shaft extending exteriorly of said housing through said fourth plate, wherein said shaft is mounted in a bearing and said central area of said fourth plate includes an annular flange extending toward said rotor for extending around and supporting said bearing, and also including a thrust plate positioned against said first plate to intersect the axis thereof for engaging an end of the shaft extended into the housing and thereagainst.

9. In a synchronous motor structure as set forth in claim 4, wherein said teeth of said second and third plates are joined by arcuate flange portions defining passages through said flanges and said plates, and wherein said rotor has a plurality of radially extending vanes integrally formed therewith on the sides thereof adjacent said second and third plates and lying in planes perpendicular to the plane of said rotor for moving air through said passages upon rotation of said rotor.

* * * * *